(12) United States Patent
DeLisio et al.

(10) Patent No.: US 6,458,469 B1
(45) Date of Patent: *Oct. 1, 2002

(54) MULTILAYER ORIENTED FILMS WITH METALLOCENE CATALYZED POLYETHYLENE SKIN LAYER

(75) Inventors: John P. DeLisio, Luxembourg (LU); Lyle J. Harley, Newark, NY (US); Jay K. Keung, Victor, NY (US); Robert G. Peet, Pittsford, NY (US)

(73) Assignee: ExxonMobil Chemical Company, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,559

(22) Filed: Jul. 8, 1999

(51) Int. Cl.[7] ............................................. B32B 27/32
(52) U.S. Cl. ........................ 428/516; 428/523; 428/910; 428/515; 264/173.15
(58) Field of Search ................................ 428/515, 516, 428/523, 910; 264/173.15

(56) References Cited

U.S. PATENT DOCUMENTS

| | | | |
|---|---|---|---|
| 4,377,616 A | 3/1983 | Aschraft et al. ............ | 428/213 |
| 4,604,324 A | 8/1986 | Nahmias et al. ............ | 428/349 |
| 5,491,019 A * | 2/1996 | Kuo et al. ................... | 428/213 |
| 5,910,374 A * | 6/1999 | Shah ........................ | 428/474.4 |
| 5,981,047 A * | 11/1999 | Wilkie ........................ | 428/215 |
| 6,261,994 B1 * | 7/2001 | Bourdelais et al. ......... | 503/227 |

FOREIGN PATENT DOCUMENTS

| | | |
|---|---|---|
| EP | 562496 | 9/1993 |
| WO | 93/03093 | 2/1993 |
| WO | 95/00333 | 1/1995 |
| WO | 95/33621 | 12/1995 |

* cited by examiner

*Primary Examiner*—D. Lawrence Tarazano
(74) *Attorney, Agent, or Firm*—Dennis P. Santini; Rick F. James

(57) ABSTRACT

An oriented multilayer film comprises:

(a) a base layer containing a thermoplastic polymer;
(b) at least one tie layer; and
(c) at least one outer layer containing a metallocene catalyzed polyethylene chosen for its performance as an adhesion layer and having improved processability. The multilayer films are useful for various end uses including printing, metallization, adhesive lamination, and cold sealing.

13 Claims, No Drawings

MULTILAYER ORIENTED FILMS WITH METALLOCENE CATALYZED POLYETHYLENE SKIN LAYER

FIELD OF THE INVENTION

The present invention relates to a film incorporating a metallocene catalyzed polyethylene layer having improved processability. More particularly, the present invention relates to an oriented multilayer film which may contain at least one intermediate or tie layer and at least one metallocene catalyzed polyethylene outer or skin layer having improved processability.

DESCRIPTION OF THE RELATED ART

Oriented polypropylene films are known for use in packaging operations. For example, U.S. Pat. No. 4,604,324 to Nahmias, et al. discloses multilayer polypropylene film structures comprising coextruded layers of a base layer of high stereoregularity polypropylene and a skin layer of comparatively low stereoregularity which contains surface-modifying additives. The skin layer may be, for example, random copolymers of ethylene and propylene and ethylene-propylene-butylene terpolymers. Further, the skin layer may contain up to 10% by weight of a natural or synthetic terpene resin, a wax or a low molecular weight polyethylene to improve the heat sealing characteristics or the optical properties of the film.

PCT Publication No. WO 93/03093 discloses heat sealed articles and heat sealable films incorporating ethylene interpolymer skins having a narrow composition distribution and a narrow molecular weight distribution or blends thereof. The publication states that metallocene catalysts may be used to form the ethylene interpolymers. This PCT publication, however, does not describe a multilayer film containing at least one tie layer and at least one skin layer of a metallocene catalyzed polyethylene, which skin layer is chosen for its performance as a layer to which further materials can be readily adhered and which may be unsuitable for a heat sealing film.

While multilayer films containing skin layers made from conventional Ziegler-Natta catalyzed polyethylene and propylene terpolymers have been used, an improvement in the characteristics of the surface layer that provide a base to which further materials can be readily adhered, and an improvement in operability over such skin layers would be desirable. For purposes of simplification, the characteristics of the surface layer that provide a base to which further materials can be readily adhered will be referred to as the adherability of that layer or surface. That layer or surface will be referred to as an adhesion layer. Conventional Ziegler-Natta catalyzed olefin polymers (e.g., low density polyethylene (LDPE)) often exhibit a tendency to stick to the contact rolls during orientation, thereby resulting in the destruction of product and/or time-consuming cleaning operations.

Accordingly, it is an object of the present invention to provide a multilayer film which has superior "adherability" and yet improved processability (i.e., less sticky to the contact rolls during orientation).

SUMMARY OF THE INVENTION

We have now discovered that the use of a metallocene catalyzed polyethylene outer or skin layer provides a multilayer film which meets the objectives of the present invention.

Specifically, the present invention relates to an oriented multilayer film comprising:

(a) a base layer containing a thermoplastic polymer;

(b) at least one tie layer; and (c) at least one outer layer containing a metallocene catalyzed polyethylene.

In one embodiment, the present invention is directed to an oriented multilayer film comprising:

(a) a base layer containing a thermoplastic polymer;

(b) at least one tie layer; and (c) at least one outer adhesion layer containing a metallocene catalyzed low density polyethylene.

DETAILED DESCRIPTION OF THE PREFERRED EMBODIMENTS

The thermoplastic polymer contained in the base layer may be any suitable polymer useful in the manufacture of thermoplastic films. Particularly preferred polymers include propylene homopolymers and copolymers. Other useful polymers include, but are not limited to, polyesters, polycarbonates, polyamides, polyethylenes, etc. In a preferred aspect of the present invention, the thermoplastic polymer contained in the base layer should have a melting point that is higher than that of the metallocene catalyzed polyethylene (e.g., metallocene catalyzed low density polyethylene).

Propylene homopolymers which are particularly useful include polypropylene having an isotacticity of about 80 to about 99%, most preferably polypropylene having an isotacticity of about 87 to about 97 % (isotacticity measured according to meso pentads using $C^{13}$ NMR). Preferably, the propylene homopolymers have a melt flow ranging from about 0.5 to about 15 g/10 minutes, most preferably from about 1.5 to about 5 g/10 minutes (measured in accordance with the standard test for polypropylene under ASTM D1238) and a melting point of above about 150° C.

Syndiotactic polypropylene homopolymers are also suitable for the base layer of this invention. These would preferably comprise 60-95% racemic pentads, based on $C^{13}$ NMR. They would preferably have a melt flow ranging from about 0.5 to about 15 g/10 minutes.

Preferred propylene copolymers include propylene/ethylene copolymers, propylene/butene-1 copolymers, propylene/ -pentene copolymers, propylene/1-hexene copolymers, and propylene/4-methyl-1 -pentene copolymers, and the like. Most preferably, these propylene copolymers may be selected from 95–99.5/0.5–5 weight ratio propylene/ethylene copolymers, 65–99.5/0.5–35 weight ratio propylene/butene-1 copolymers, 50–99.5/0.5–50 weight ratio propylene/1 -pentene copolymers, 50–99.5/0.5–50 weight ratio propylene/1-hexene copolymers, and 50–99.5/0.5–50 weight ratio propylene/4-methyl-1-pentene copolymers, and the like.

Commercially available olefin polymers, such as Fina 3371 isotactic polypropylene, and Fina EOD 95-01 and EOD 95-02 syndiotactic polypropylene, sold by Fina Oil and Chemical Co., may be used as the base layer material.

In addition to the base layer, the multilayer film structure of the present invention comprises at least one intermediate or tie layer between the base layer and at least one outer layer. The intermediate or tie layer preferably includes one or more polymers selected from metallocene and Ziegler-Natta catalyzed polyethylene, isotactic polypropylene, syndiotactic polypropylene, grafted polypropylenes, grafted polyethylenes, copolymers and terpolymers of ethylene and/ or propylene with polar comonomers, etc., which preferably have a melt index of about 0.1 to about 10 g/10 minutes or a melt flow of about 0.5 to 15g/10 minutes (measured according to ASTM D1238) and a melting point of about 110° C. to about 165° C.

Among the polymers commercially available, Fina 3371 isotactic polypropylene and Fina EOD 95-01 and EOD 95-02 syndiotactic polypropylenes have demonstrated utility as the intermediate or tie layer material.

Metallocene catalyzed polyethylenes suitable for use as the outer layer in this invention are chosen on the basis of their adhesion performance. In most cases, use as a sealant layer is unsatisfactory due to unacceptably high minimum seal temperature (MST) or unacceptably low hot tack, or both.

Any suitable metallocene catalyzed polyethylene so chosen may be used as the outer layer in the present invention. Such metallocene catalyzed polyethylene includes homopolymers as well as copolymers, and may be produced according to known polymerization techniques. Typically, ethylene and optional comonomers are contacted with a catalyst composition comprising at least one metallocene compound and at least one activator under polymerization conditions.

The activators that may be used in combination with the metallocene compounds include, but are not limited to, aluminoxanes and substituted aluminoxanes as well as various ionic compounds.

Typically, the metallocene catalyzed polyethylene in the outer layer of the present invention has a melt index of about 0.1 to about 10 g/10 minutes (measured in accordance with ASTM D1238), a density of about 0.88 to about 0.965 g/cm$^3$, a polydispersity $M_w/M_n$ of about 2 to about 10, and a melting point of about 90 to about 140° C.

Commercially available metallocene catalyzed polyethylenes such as Dow AFFINITY PL-1840 and DPF-1340 and Exxon EXXACT 3027, may be used for this purpose. In comparison to traditional Ziegler-Natta catalyzed propylene copolymer and terpolymer materials, metallocene catalyzed polyethylene materials exhibit significantly narrower molecular weight distributions.

A metallocene catalyzed LDPE will have superior processability as compared to a Ziegler-Natta catalyzed polyethylene of similar density, because a metallocene catalyzed LDPE has a narrower molecular weight distribution (as indicated by lower polydispersity) and a more uniform composition (i.e., comonomer incorporation) distribution. These features result in less material that can begin to melt and/or become tacky at temperatures below the actual polymer melting point. In particular, a metallocene catalyzed LDPE will be less sticky in the machine direction orientation step as compared to a Ziegler-Natta catalyzed polyethylene of similar density. While exhibiting improved processability, a metallocene catalyzed LDPE provides an adhesion quality that is comparable to or better than that of a Ziegler-Natta catalyzed polyethylene. The hot tack of the metallocene catalyzed polyethylenes, on the other hand, can frequently be unacceptable compared to the hot tack of the Ziegler-Natta catalyzed copolymers and terpolymers, due in part to the narrow molecular weight distribution.

The further surface applications onto the multilayer film structure comprising an adhesion layer based on a metallocene catalyzed LDPE may include but would not be limited to printing, metallization, adhesive lamination, and cold sealing.

The multilayer film structure of the present invention may be clear or opaque. In the case of an opaque multilayer film structure, the opacity is provided by creating voids, commonly referred to as "cavitation." The creation of these voids is accomplished by incorporating a dispersed, incompatible, void-initiating phase in one or more of the layers that make up the film structure. Under the stresses applied in the orientation step(s), a voided or cavitated layer is created. Such a method for creating voids is well known in the art and is described, for example, in U.S. Pat. No. 4,377,616 to Ashcraft et al., which is incorporated herein by reference. Upon orientation of the layer, the dispersed void-initiating phase causes strata of voids to form at the location of the dispersed incompatible material. These voids typically impart a high degree of opacity to the film.

The void-initiating phase can be any material which is capable of forming voids without causing degradation in the film material, such as those materials described in U.S. Pat. No. 4,377,616 to Ashcraft et al. Preferably, the void-initiating materials are thermoplastic resins with a higher melting point than the polymer material of the layer in which they are incorporated. Exemplary preferred void-initiating materials include polyamides, nylons, polyesters, as well as acrylic resins. Most preferably, the void-initiating phase is polybutylene terephthalate (PBT).

Suitable amounts of the void-initiating particles may be from about 2% to about 15% by weight based on the total weight of the layer being voided.

The multilayer film structure may, for example, comprise five layers, wherein the base layer is sandwiched between two tie layers and skin layers are disposed on the outer surface of the tie layers. Other configurations are also possible, and they are limited only by the intended effects of the present invention.

In order to modify or enhance certain properties of the multilayer films of the present invention for specific end uses, it is possible for one or more of the layers to contain various additives in effective amounts. Such additives include, but are not limited to, antiblocking agents such as natural and synthetic silicas and silicates, clays, organic "beads," long chain fatty acid derivatives, silicone derivatives, among others; coefficient of friction reducing agents such as erucamide, stearamide, silicone oil, silicone gum, among others; antistatic agents such as glycerol monostearate (GMS), long chain fatty acid amines, among others; opacifying agents such as titanium dioxide, among others; colorants; clarifiers; primers; and others known to those skilled in the art.

One or more of the exposed layers of the multilayer film structures of the present invention may be surface-treated to render the films to be more receptive to printing inks, adhesives, coatings and the like. The surface treatment may be carried out by any method known in the art such as corona discharge treatment or flame treatment. Further, one or both of the outermost surfaces of the film structure may be coated with various compositions known in the art (e.g., primers, coatings, etc.).

The multilayer film structures of the present invention may have an overall thickness of about 0.2 mil to about 5 mils, preferably about 0.4 mil to about 2.5 mils. The thickness of the base layer may constitute about 30% to about 90% of the overall thickness, the thickness of the tie layers may constitute about 5% to about 40% of the overall thickness, and thickness of the outer layer may constitute about 0.5 to about 10% of the overall thickness.

When the outer layer is an adhesion layer containing LDPE, the outer layer preferably has a thickness of about 3 to about 5 gauge units, the tie layer preferably has a thickness of about 10 to about 20 gauge units, and the base layer preferably has a thickness of about 50 to about 150 gauge units.

The present invention also relates to a method for making a multilayer film structure, which is preferably a coextruded film wherein various resin compositions as described above form the specific layers of the film structure. In the method, various olefin polymers or olefin polymer compositions are coextruded to provide a multilayer base web structure having film layers corresponding to the various olefin polymers or olefin polymer compositions.

The multilayer base web structure thus formed represents an intermediate structure which is then subjected to orientation to produce a multilayer oriented film structure. Orientation of such coextruded base webs is well known in the art and results in improved physical properties of the composite layers such as flex-cracking resistance, Elmendorff tear strength, elongation, tensile strength, impact strength, and cold strength properties. In embodiments incorporating cavitated or voided layers, such orientation further provides for the creation of voids, as described in U.S. Pat. No. 4,377,616 to Ashcraft et al.

Typically, the film structure is biaxially oriented about 4 to about 6 times, preferably about 4 to about 5.5 times, in the machine direction and about 7 to about 12 times, preferably about 8 to about 10 times, in the transverse direction. The orientation of the film structure may be conducted at temperatures ranging from about 100° C. to about 160° C.

The multilayer film structures of the present invention may be used in a variety of different applications, including packaging films for food products, and are particularly well suited for adhesive laminating, printing, metallizing or cold sealing applications.

The present invention may be further understood with reference to the following non-limiting examples.

syndiotactic polypropylene was melted and extruded by means of a first extruder to provide a base layer. A second and a third extruder, in association with the first extruder, were supplied with the isotactic polypropylene. These second and third extruders provided the tie layers. A fourth extruder, in association with the first three extruders, was supplied with Exxon 3016 or 3027 metallocene catalyzed polyethylene. A melt coextrusion was carried out maintaining the polymer material at a temperature sufficient to maintain all polymers in the molten state (about 230° C. to about 290° C.). The polymer extruded as the tie layers was maintained at about the same temperature as the polymer used in making the base layer, as was the metallocene catalyzed polyethylene. The metallocene catalyzed polyethylene was split into two streams to enable formation of the outer layers on each surface of the two tie layers.

The unoriented film structures each measured about 45 mils in thickness. Also, in the unoriented film structures of each of these examples, the base layer accounted for about 50% of the overall thickness, the tie layers accounted for about 40% of the overall thickness, and the outer layers accounted for about 10% of the overall thickness.

The unoriented film structures of Examples 1–3 were then biaxially oriented. Specifically, the film structures were stretched about 5 times in the machine direction and about 8 times in the transverse direction.

The properties of the film structures thus obtained are reported in Table 1.

The process would run with these low density metallocene catalyzed polyethylene skins. Typically, Ziegler-Natta catalyzed catalyzed polyethylenes of such low density would stick to the MD rolls and cause film breaks.

TABLE 1

| | Core Melt Flow | Skin Melt Index | Skin Density | Modulus[6] MD | Modulus[6] TD | Elongation[7] MD | Elongation[7] TD | Ultimate Tensile[8] MD | Ultimate Tensile[8] TD | Dimensional Stability[2] MD | Dimensional Stability[2] TD | Haze[9] | Gloss[10] | WVTR[3] | Tear Strength[4] MD | Tear Strength[4] TD | Puncture Resistance[5] |
|---|---|---|---|---|---|---|---|---|---|---|---|---|---|---|---|---|---|
| Ex. 1 | 8 | 4.5 | 0.910 | 150 | 283 | 172 | 47 | 9.2 | 16.7 | −7.4 | −7.9 | 3.1 | 90.7 | 0.52 | 12.8 | 4.2 | 1301 |
| Ex. 2 | 3.5 | 4.5 | 0.910 | 143 | 227 | 146 | 42 | 8.9 | 11.6 | −5.0 | −13.9 | 2.5 | 85.8 | 0.59 | 13.5 | 5.6 | 1191 |
| Ex. 3 | 3.5 | 3.5 | 0.900 | 148 | 227 | 140 | 59 | 9.2 | 12.1 | −4.7 | −14.2 | 1.7 | 90.8 | 0.60 | 12.3 | 4.9 | 1314 |

[1]Measured in accordance with ASTM D882.
[2]Percent change, measured in accordance with ASTM D1204.
[3]Water vapor transmission rate, expressed as g/100 in$^2$/day, measured in accordance with ASTM F1249.
[4]g/mil, measured in accordance with ASTM D1922.
[5]g/mil, measured in accordance with standard Mobil test.
[6]psi
[7]percent elongation
[8]psi
[9]percent light transmittance, measured in accordance with ASTM D1003.
[10]percent light reflected at 45 degree angle, measured in accordance with ASTM D2457.

EXAMPLES 1–3

In Examples 1–3, multilayer film structures having the configuration ABCBA, wherein layers A contain metallocene catalyzed polyethylene having a melt index of about 3.5 and 4.5, layers B are tie layers containing Fina 3371 isotactic polypropylene having a melt flow of about 2.8, and layer C is a base layer containing Fina EOD 95-01 syndiotactic polypropylene having a melt flow of about 3.5 or Fina EOD 95-02 syndiotactic polypropylene having a melt flow of about 8, were produced. In each of these examples, the

EXAMPLE 4

A five layer, white opaque OPP film structure comprising a base layer, two tie layers on either side of the base layer, and two adhesion layers on the outer sides of the two tie layers was produced. The base layer contained a propylene homopolymer, Fina 3371, having a melt flow of about 2.8 and about 8% by weight of polybutylene terephthalate. The tie layers contained the same propylene homopolymer as used in the core, plus about 4 wt % of titanium dioxide. The adhesion layers contained a metallocene catalyzed LDPE having a density of about 0.910 g/cm³ and a melt index of about 1.0. The molten polymers were coextruded as an unoriented web, stretched about 5 times in the machine direction at about 110° C. and about 8 times in the transverse direction at about 155° C.

Again, the use of the metallocene catalyzed LDPE adhesion layers resulted in improved processability without sacrificing adhesion quality.

What is claimed is:

1. An oriented multilayer film comprising:
   (a) a base layer containing a thermoplastic polymer;
   (b) at least one tie layer; and
   (c) at least one outer layer consisting of a metallocene catalyzed polyethylene,
      wherein the at least one outer layer (c) possesses at least one of a low hot tack and a high minimum seal temperature such that said at least one outer layer (c) is not a heat-sealable layer.

2. The oriented multilayer film as claimed in claim 1, wherein said at least one outer layer is an adhesion layer.

3. The oriented multilayer film as claimed in claim 2, wherein said metallocene catalyzed polyethylene is low density polyethylene (LDPE).

4. The oriented multilayer film as claimed in claim 1, wherein the thermoplastic polymer of said base layer is selected from the group consisting of propylene homopolymers, propylene copolymers and terpolymers, polyesters, polycarbonates, polyamides, and polyethylenes.

5. The oriented multilayer film as claimed in claim 4, wherein the thermoplastic polymer contained in the base layer has a melting point that is higher than that of the metallocene catalyzed polyethylene of the outer layer.

6. The oriented multilayer film as claimed in claim 1, wherein said tie layer contains at least one polymer selected from the group consisting of metallocene catalyzed polyethylenes, Ziegler-Natta catalyzed polyethylenes, isotactic polypropylenes, syndiotactic polypropylenes, grafted polypropylenes, grafted polyethylenes, and copolymers and terpolymers of propylene and/or ethylene with polar comonomers.

7. The oriented multilayer film as claimed in claim 1, wherein said film comprises at least five layers.

8. The oriented multilayer film as claimed in claim 1, wherein said metallocene catalyzed polyethylene of the outer layer has a melt index ranging from about 0.1 to about 10 g/10 minutes, a density ranging from about 0.88 to about 0.965 g/cm³, polydispersity ranging from about 2 to about 10, and a melting point ranging from about 90° C. to about 140° C.

9. The oriented multilayer film as claimed in claim 1, wherein the base layer is voided.

10. A process for preparing an oriented multilayer film, comprising:
    (a) coextruding a thermoplastic polymer, a second polymer, and a metallocene catalyzed polyethylene to form an unoriented multilayer film structure comprising a base layer, a tie layer, and an outer layer, wherein the base layer comprises the thermoplastic layer, the tie layer comprises the second polymer, and the outer layer consists of the metallocene catalyzed polyethylene; and
    (b) stretching the unoriented multilayer film structure in the machine and/or transverse direction(s),
       wherein the outer layer possesses at least one of a low hot tack and a high minimum seal temperature such that said outer layer is not a heat-sealable layer.

11. An oriented multilayer film comprising:
    (a) a base layer containing a thermoplastic polymer;
    (b) at least one tie layer; and
    (c) at least one outer layer consisting of a metallocene-catalyzed polyethylene and, optionally, one or more additives selected from the group consisting of antiblocking agents, coefficient of friction reducing agents, antistatic agents, opacifying agents, colorants, clarifiers, and primers,
       wherein the at least one outer layer (c) possesses at least one of a low hot tack and a high minimum seal temperature such that said at least one outer layer (c) is not a heat-sealable layer.

12. The oriented multilayer film of claim 11, wherein the base layer is voided.

13. The oriented multilayer film of claim 11, wherein the metallocene-catalyzed polyethylene is a low density metallocene-catalyzed polyethylene.

* * * * *